(12) United States Patent
You

(10) Patent No.: US 7,787,910 B2
(45) Date of Patent: Aug. 31, 2010

(54) MOBILE TERMINAL HAVING DISPLAY UNIT SEPARABLE FROM MAIN UNIT AND METHOD THEREOF

(75) Inventor: Jeong-Min You, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 877 days.

(21) Appl. No.: 11/501,792

(22) Filed: Aug. 9, 2006

(65) Prior Publication Data

US 2007/0037604 A1 Feb. 15, 2007

(30) Foreign Application Priority Data

Aug. 9, 2005 (KR) ............... 10-2005-0072866

(51) Int. Cl.
*H04B 1/38* (2006.01)
*H04M 1/00* (2006.01)
(52) U.S. Cl. .............. 455/566; 455/67.7; 455/556.1
(58) Field of Classification Search ............. 455/566, 455/550.1, 41.2, 90.3, 575.1, 556.1, 569.1, 455/67.7, 557, 514, 556.2, 41.1
See application file for complete search history.

(56) References Cited

U.S. PATENT DOCUMENTS 6,640,113 B1 * 10/2003 Shim et al. ............ 455/566
7,529,559 B2 * 5/2009 Yamanaka et al. ........ 455/550.1
2003/0153363 A1 * 8/2003 Kuwazoe ................ 455/566
2004/0043799 A1 * 3/2004 Ishibashi et al. ......... 455/575.1
2006/0099995 A1 * 5/2006 Kim et al. .............. 455/566
2007/0123163 A1 * 5/2007 Matsubara .............. 455/3.06
2008/0032755 A1 * 2/2008 Fraser et al. ............ 455/575.1

* cited by examiner

*Primary Examiner*—Pablo N Tran
(74) *Attorney, Agent, or Firm*—The Farrell Law Firm, LLP

(57) ABSTRACT

A mobile terminal that has a display unit separable from a main unit and a method thereof are provided. The main unit includes a first separation sensor for sensing separation of the display unit; a radio frequency (RF) transmission unit for wirelessly transmitting data to be output to the display unit by radio; and a main unit controller for setting a path of the data to be output to the display unit to the RF transmission unit if the separation of the display unit is sensed by the first separation sensor. The display unit includes a second separation sensor for sensing separation from the main unit; an RF receiver unit for receiving data transmitted wirelessly from the RF transmission unit; a display controller for setting a path of the data input to the display unit to the RF receiver unit if the separation from the main unit is sensed by the second separation sensor; a memory for storing the data received by the RF receiver unit; and a display module for displaying the data stored in the memory.

15 Claims, 7 Drawing Sheets

MOBILE TERMINAL HAVING DISPLAY UNIT SEPARABLE FROM MAIN UNIT AND METHOD THEREOF

PRIORITY

This application claims priority under 35 U.S.C. §119 to an application entitled "Mobile Terminal Having Display Unit Separable from Main Unit and Method thereof" filed in the Korean Intellectual Property Office on Aug. 9, 2005 and assigned Serial No. 2005-72866, the contents of which are incorporated herein by reference.

BACKGROUND OF THE INVENTION

1. Field of the Invention

The present invention relates generally to a mobile terminal, and in particular, to a mobile terminal having a display unit separable from a main unit and a method thereof.

2. Description of the Related Art

In a mobile terminal providing image information, such as a mobile phone having a camera function or a mobile terminal having a digital multimedia broadcasting (DMB) receiving function, a display unit for displaying image information to a user is fixedly formed in one body with a main unit. Where the display unit is fixedly formed in one body with the main unit of the mobile terminal, the user's ability to operate the display unit to view the image information in various ways is limited.

SUMMARY OF THE INVENTION

An object of the present invention is to substantially solve at least the above problems and/or disadvantages as well as to provide at least the advantages described below. Accordingly, an object of the present invention is to provide a mobile terminal having a display unit separable from a main unit and a method thereof.

According to an aspect of the present invention, there is provided a mobile terminal having a display unit separable from a main unit, the main unit having a first separation sensor for sensing separation of the display unit; a Radio Frequency (RF) transmission unit for wirelessly transmitting data to be output to the display unit; and a main unit controller for setting a path of the data to be output to the display unit to the RF transmission unit if the separation of the display unit is sensed by the first separation sensor, and the display unit including a second separation sensor for sensing separation from the main unit; an RF receive unit for receiving data transmitted by radio from the RF transmission unit; a display controller for setting a path of the data input to the display unit to the RF receiver unit if the separation from the main unit is sensed by the second separation sensor; a memory for storing the data received by the RF receiver unit; and a display module for displaying the data stored in the memory.

According to another aspect of the present invention, there is provided a method of controlling a display unit of a mobile terminal having the display unit separable from a main unit, the method includes sensing whether the display unit is separated from the main unit; transmitting by radio data to be output to the display unit if the display unit is separated from the main unit; receiving, by the display unit separated from the main unit, the data transmitted by radio from the main unit and storing the received data in a memory of the display unit; and displaying the data stored in the memory.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
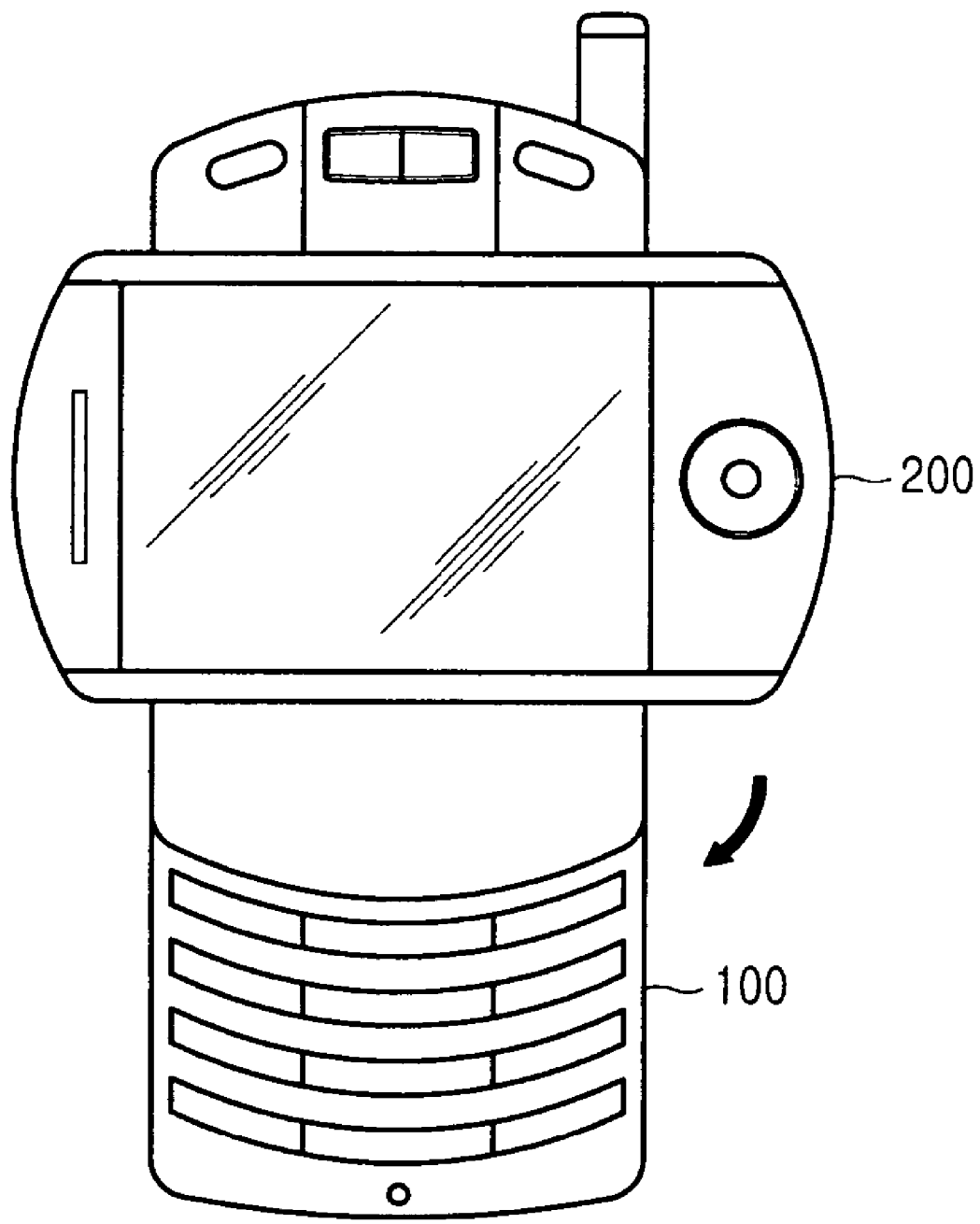
FIGS. 1 and 2 are plan views illustrating a state of rotating a display unit of a mobile terminal to separate the display unit from a main unit, according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

According to a basic principle of the present invention, a user can freely carry a display unit of a mobile terminal by separating the display unit from a main unit of the mobile terminal. A way of separating the display unit from the main unit will be described below with reference to FIGS. 1 and 2.

Figure 2:
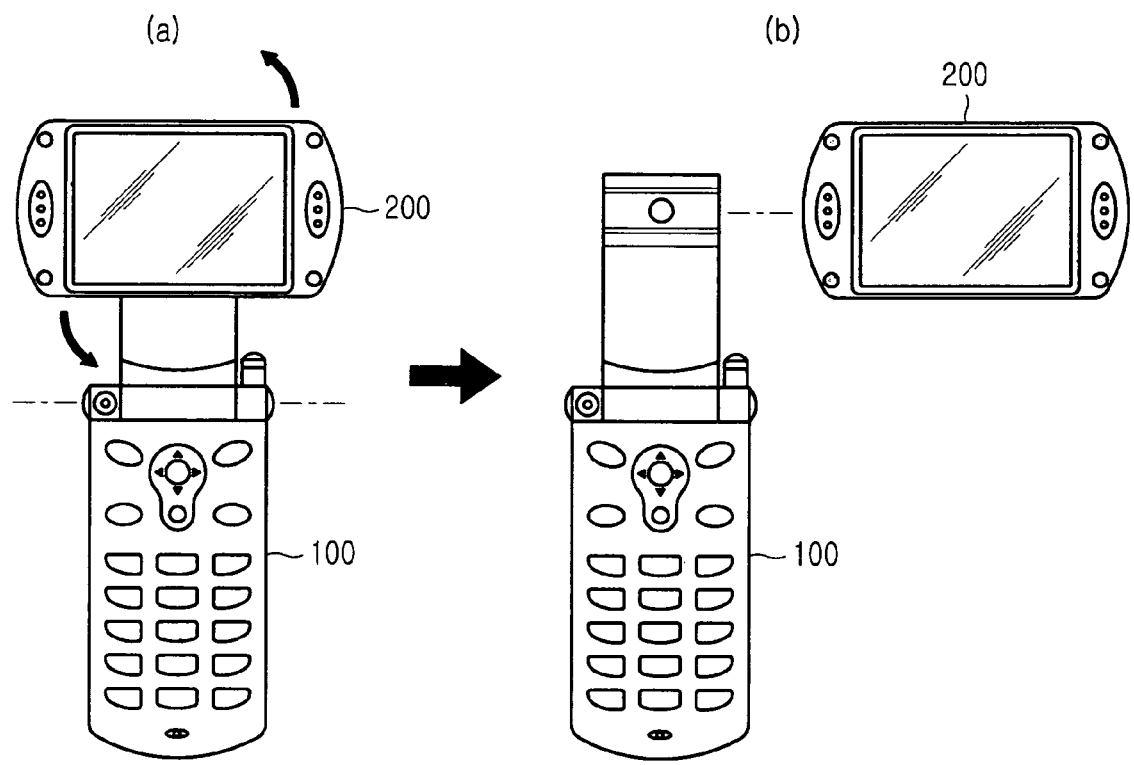

FIGS. 1 and 2 are plan views illustrating a state in which a display unit 200 of a mobile terminal is swiveled in order to separate the display unit from a main unit 100, according to the present invention.

Referring to FIG. 1, the mobile terminal includes the main unit 100 and the display unit 200. The display unit 200 is facing and rotatably coupled to the main unit 100. Since this structure is the same as that of a typical swivel type mobile terminal, detailed description of the structure is omitted. The user can separate the display unit 200 from the main unit 100 if the display unit 200 is in a swiveled state. If the display unit 200 is in the swiveled state on the main unit 100 as illustrated in FIG. 2A, the user can separate the display unit 200 from the main unit 100 as illustrated in FIG. 2B. A configuration of the mobile terminal in which the display unit 200 is separated from the main unit 100 will be described below with reference to FIG. 3.

Figure 3:
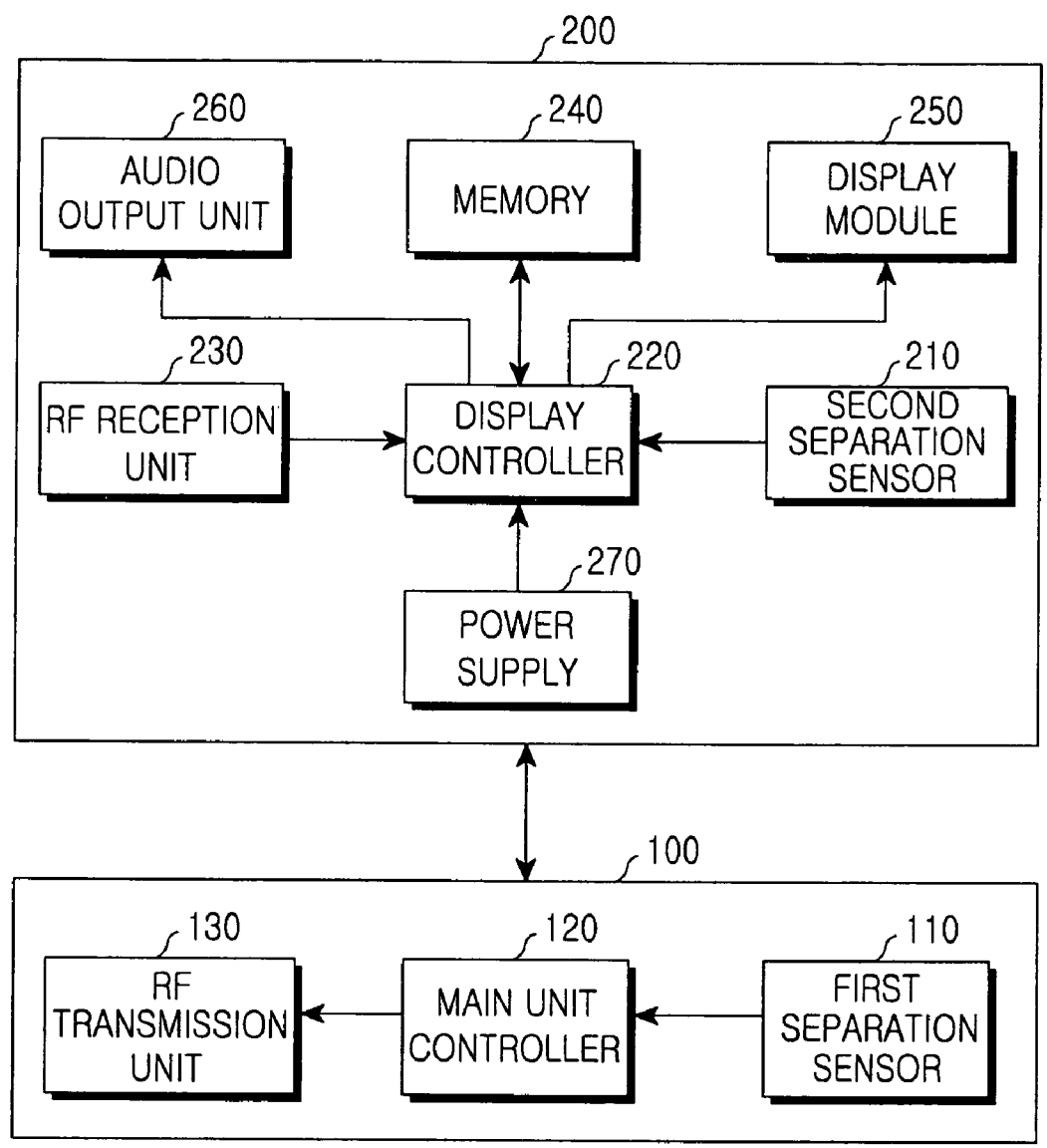
FIG. 3 is a block diagram illustrating a mobile terminal according to the present invention.

FIG. 3 is a block diagram illustrating the mobile terminal according to the present invention.

In the main unit 100 of the mobile terminal, a first separation sensor 110 senses that the display unit 200 is separated from the main unit 100 and outputs a separation signal to a main unit controller 120. Upon receipt of the separation signal from the first separation sensor 110, the main unit controller 120 sets a path of data to be output to the display unit 200 to a Radio Frequency (RF) transmission unit 130. The RF transmission unit 130 wirelessly transmits data input from the main unit controller 120 to the separated display unit 200. If the display unit 200 is not separated from the main unit 100, the mobile terminal according to the present invention uses a typical wired interface to output data from the main unit 100 to the display unit 200. A wireless communication method between the main unit 100 and the display unit 200 can be implemented using an Ultra WideBand (UWB) communication method. A configuration of the RF transmission unit 130 using the UWB communication method will be described below in detail with reference to FIG. 4.

Figure 4:
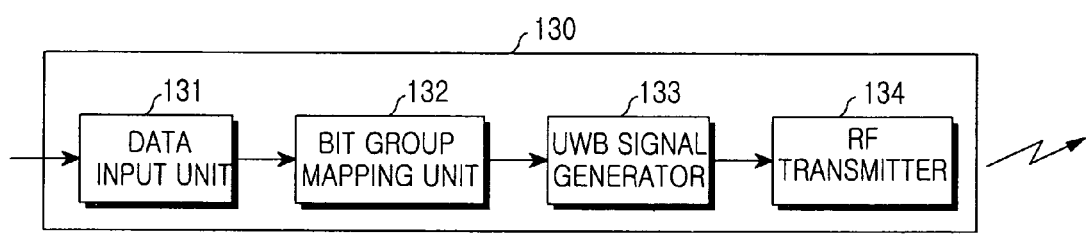
FIG. 4 is a block diagram illustrating an RF transmission unit included in the main unit of the mobile terminal according to the present invention.

FIG. 4 is a block diagram illustrating the RF transmission unit 130 included in the main unit 100 of the mobile terminal according to the present invention.

Referring to FIG. 4, the RF transmission unit 130 includes a data input unit 131, which is an interface for receiving digital data to be output to the display unit 200, i.e., data input from the main unit controller 120, a bit group mapping unit 132 for grouping the digital data input through the data input unit 131 to bit groups, a UWB signal generator 133 for generating a UWB signal having symbols mapped to the bit groups input from the bit group mapping unit 132, and an RF transmitter 134 for transmitting the generated UWB signal using an RF channel. A configuration of the display unit 200 for receiving the UWB signal transmitted via an RF channel from the RF transmitter 134 and displaying information corresponding to the received UWB signal will be described below in detail by referring back to FIG. 3.

A second separation sensor 210 of the display unit 200 senses that the display unit 200 is separated from the main unit 100 and outputs a separation signal to a display controller 220. Upon receipt of the separation signal from the second separation sensor 210, the display controller 220 sets a path of data input to the display unit 200 to an RF receiver unit 230. When the RF receiver unit 230 is activated by the main unit controller 120 by the user separating the display unit 200 from the main unit 100 in a state where the display unit 200 is coupled to the main unit 100, the RF receiver unit 230 receives data wirelessly transmitted from the RF transmission unit 130 of the main unit 100. The RF receiver unit 230 receives a UWB signal transmitted by radio from the RF transmission unit 130 of the main unit 100 and converts the received UWB signal to digital data. A configuration of the RF receiver unit 230 will now be described in detail with reference to FIG. 5.

Figure 5:
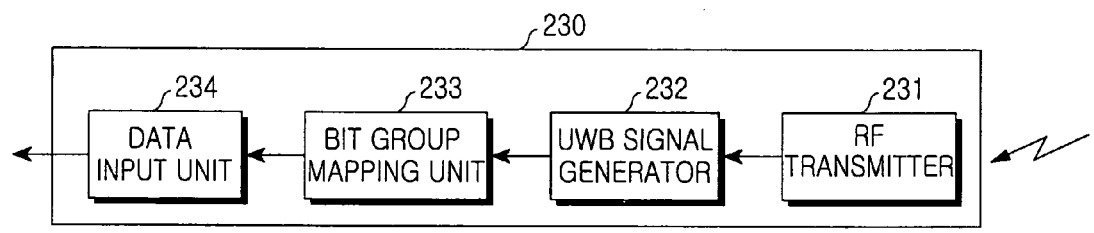
FIG. 5 is a block diagram illustrating an RF receiver unit included in the display unit of the mobile terminal according to the present invention.

FIG. 5 is a block diagram illustrating the RF receiver unit 230 included in the display unit 200 of the mobile terminal according to the present invention.

The RF receiver unit 230 includes an RF receiver 231 for receiving the UWB signal input via an RF channel, a signal detector 232 for detecting a subband of the UWB signal received by the RF receiver 231, a bit group mapping unit 233 for generating digital data by generating bit groups corresponding to the subband of the UWB signal detected by the signal detector 232, and a data output unit 234 which is an interface for outputting the digital data generated by the bit group mapping unit 233 to the outside. The display controller 220 controls a memory 240 to store the digital data output from the data output unit 23 and a display module 250 to display the digital data.

The display unit 200 also includes an audio output unit 260 for outputting audio data because video data displayed on the display module 250 and the audio data are included in the UWB signal transmitted by radio from the main unit 100. For example, if the mobile terminal can receive DMB data, the RF receiver unit 230 of the separated display unit 200 wirelessly receives DMB data of a currently selected broadcasting channel from the RF transmission unit 130 of the main unit 100. Since the DMB data includes video data and audio data, the display controller 220 of the display unit 200 outputs the video data and the audio data, which is received by the RF receiver unit 230 and stored in the memory 240, through the display module 250 and the audio output unit 260.

While it is difficult for the user to safely stand a conventional mobile terminal, which has a DMB receiving function and has a display unit formed in one body with a main unit, due to the weight and size thereof, the display unit 200 separable from the main unit 100 includes built-in supporters in both sides thereof. The user can rotate the built-in supporters in the direction far from the display unit 200 to contact the built-in supporters with the ground. The rotated built-in supporters provide repulsive power to support the inclined display unit 200. Thus, the user can safely stand the separated display unit 200 using the built-in supporters and operate functions of a channel change and a volume control in remote by using the main unit 100 as a remote control while watching a DMB program. The display unit 200 also includes a power supply 270 for supplying self-power in order to display the data wirelessly transmitted from the main unit 100.

If the mobile terminal has a camera function, and if image data photographed by the user is transmitted by radio from the RF transmission unit 130 of the main unit 100 and received by the RF receiver unit 230 of the display unit 200, the display controller 220 controls the memory 240 to store the received image data and the display module 250 to display the stored image data. In this state, the user can couple the separated display unit 200 into another compatible mobile terminal (hereinafter, a mobile terminal A), and then store the image data displayed on the display module 250 in a main unit of the mobile terminal A and edit the stored image data.

Since the main unit of the mobile terminal A is compatible to the display unit 200, the main unit of the mobile terminal A has the same structure as that of the main unit 100 according to the present invention, and in this case, a display unit of the mobile terminal A is separated in advance from the main unit of the mobile terminal A in order to couple the display unit 200 to the main unit of the mobile terminal A. If the main unit of the mobile terminal A senses the coupling of the display unit 200 using the first separation sensor 110, the main unit of the mobile terminal A sets a data input/output path with the display unit 200 to the wired interface. The main unit controller 120 of the mobile terminal A displays a message on the display module 250, inquiring whether the image data displayed on the display module 250 of the display unit 200 is stored. That is, as soon as the display unit 200 is coupled into the main unit of the mobile terminal A, the message is displayed on the display module 250 by overlapping the message onto an existing screen. In this case, the display unit 200 also sets a data input/output path with the main unit of the mobile terminal A to the wired interface when display unit 200 senses the coupling to the main unit of the mobile terminal A using the second separation sensor 210.

The user can confirm the image data displayed on the display module 250 of the display unit 200 and press a key for requesting to store the displayed image data. Thereafter, the main unit controller 120 of the mobile terminal A stores the image data stored in the memory 240 of the display unit 200, i.e., the image data displayed on the display module 250, in a built-in memory via the wired interface. A process of wirelessly transmitting data to the display unit 200 separated from the main unit 100 will be described below in detail with reference to FIGS. 6 and 7.

Figure 6:
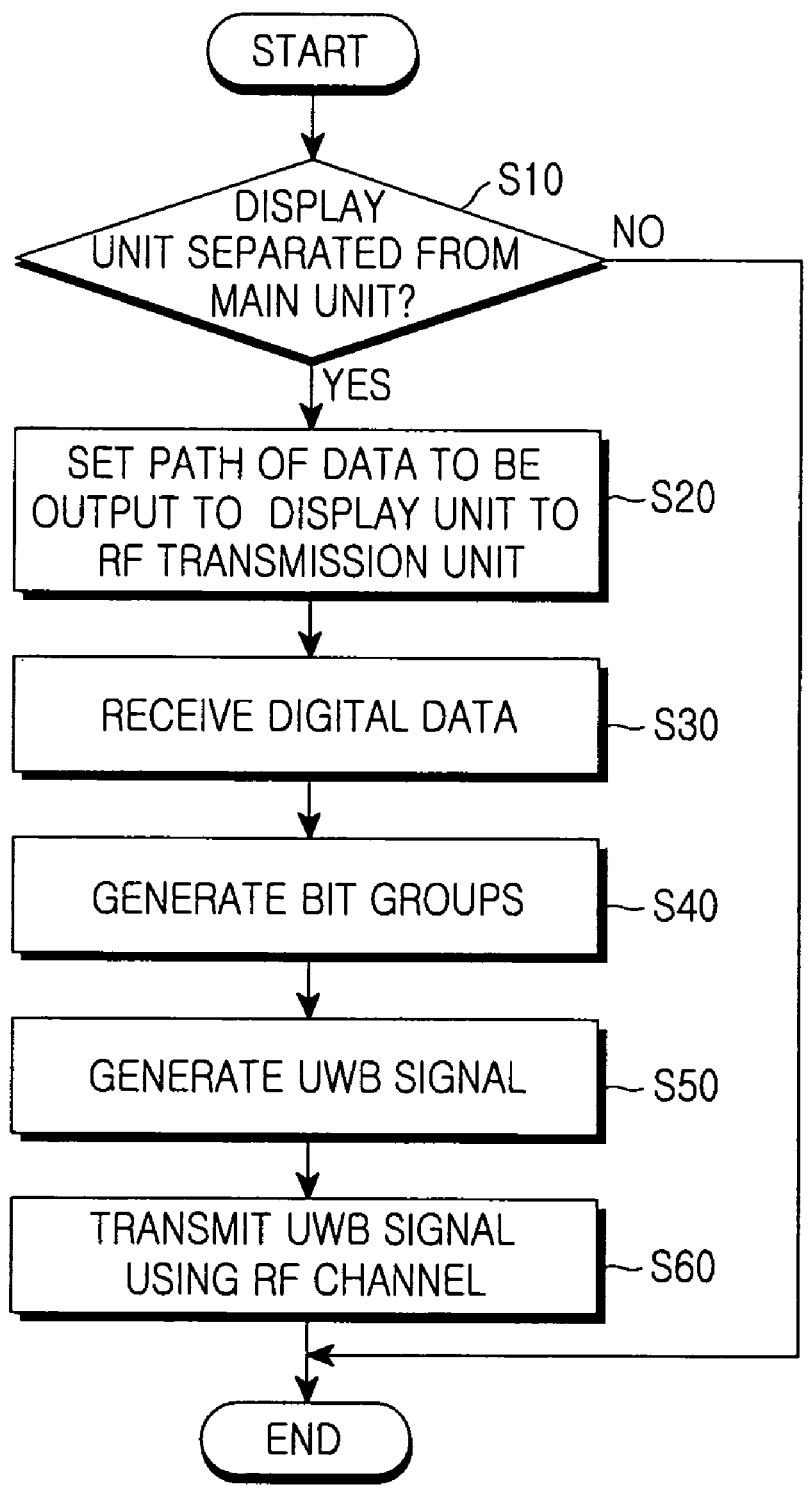
FIG. 6 is a flowchart illustrating a method of wirelessly transmitting data to the display unit separated from the main unit of the mobile terminal, according to the present invention.

FIG. 6 is a flowchart illustrating a method of wirelessly transmitting data to the display unit 200 separated from the main unit 100 of the mobile terminal, according to the present invention.

Referring to FIG. 6, the user of the mobile terminal can freely carry the display unit 200 by rotating the display unit 200 and separating it from the main unit 100 as illustrated in FIG. 2. In step S10, the main unit controller 120 of the main unit 100 determines using the first separation sensor 110 whether the display unit 200 is separated from the main unit 100. If the display unit 200 is separated from the main unit 100 as the determination result, in step S20, the main unit controller 120 sets a path of data to be output to the display unit 200 to the RF transmission unit 130. If the display unit 200 is not separated from the main unit 100 as the determination result, the main unit controller 120 uses the wired interface in order to output the data to the display unit 200.

If the path of data to be output to the display unit 200 is set to the RF transmission unit 130 in step S20, the main unit controller 120 controls the RF transmission unit 130 to generate a UWB signal of the data to be output to the display unit 200 and transmit the generated UWB signal using an RF channel. To generate the UWB signal and transmit the generated UWB signal using an RF channel, in step S30, the RF transmission unit 130 receives the data to be output to the display unit 200, i.e., a bitstream of digital data, from the main unit controller 120.

In step S40, the RF transmission unit 130 generates bit groups by grouping the received digital data in units of m bits. In step S50, the RF transmission unit 130 determines a type, i.e., a symbol, of each generated bit group according to bits of the bit group and generates a UWB signal mapped to the determined bit group type. In step S60, the RF transmission unit 130 transmits the generated UWB signal to the main unit 100 using an RF channel. A process of the display unit 200 receiving the UWB signal transmitted from the main unit 100 using an RF channel and displaying data corresponding to the received UWB signal will be described below in detail with reference to FIG. 7.

Figure 7:
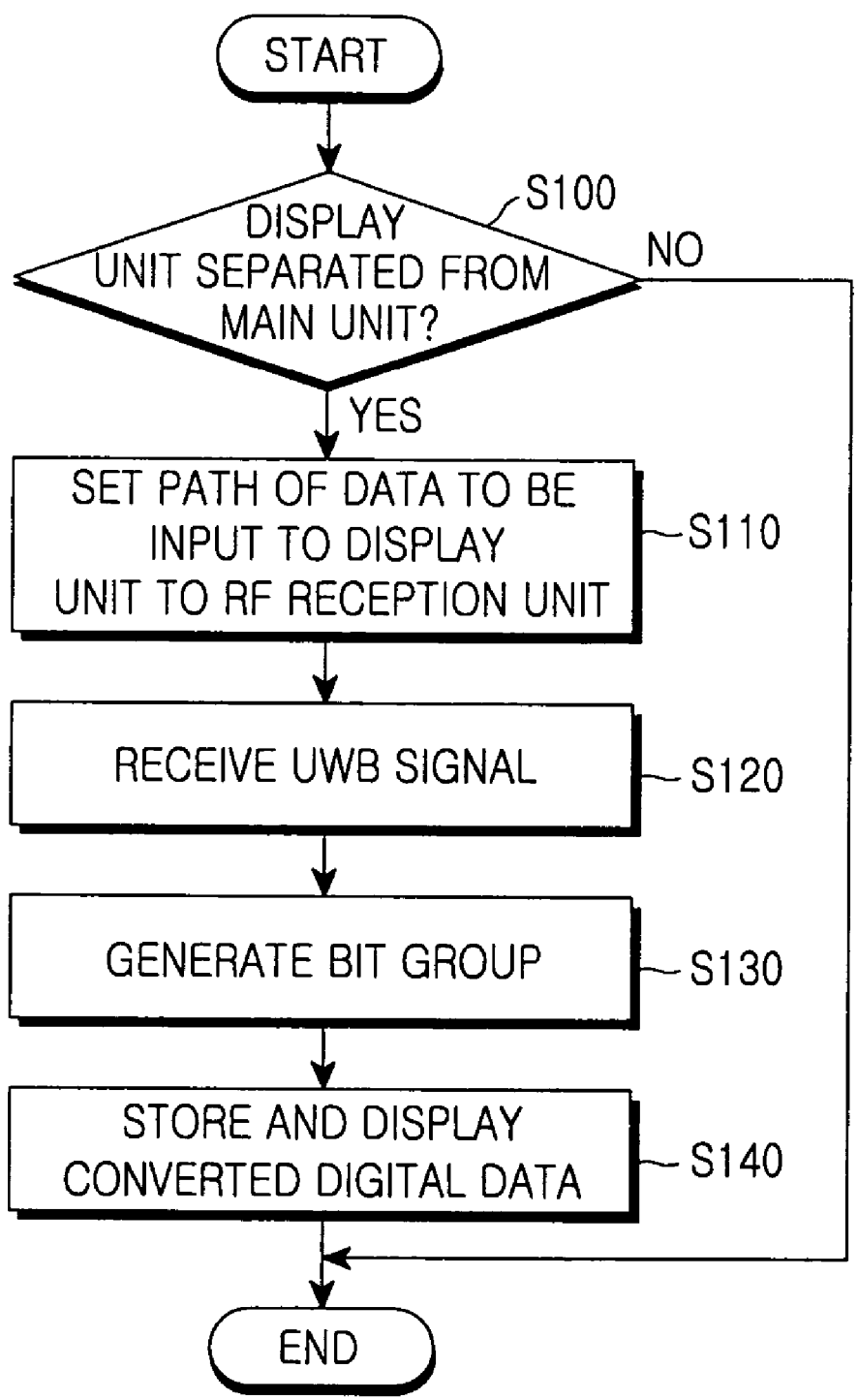
FIG. 7 is a flowchart illustrating a method of receiving and displaying data wirelessly transmitted in the display unit separated from the main unit of the mobile terminal, according to the present invention.

FIG. 7 is a flowchart illustrating a method of receiving and displaying data transmitted wirelessly in the display unit 200 separated from the main unit 100 of the mobile terminal according to the present invention.

Referring to FIG. 7, in step S100, the display controller 220 of the display unit 200 determines using the second separation sensor 210 whether the display unit 200 is separated from the main unit 100. Upon determination that the display unit 200 is separated from the main unit 100, in step S110, the display controller 220 sets a path of data to be input to the display unit 200 to the RF receiver unit 230. If it is determined that the display unit 200 is not separated from the main unit 100, the display controller 220 uses the wired interface in order to input the data output from the main unit 100.

If the path of data to be input to the display unit 200 is set to the RF receiver unit 230 in step S110, in step S120, the RF receiver unit 230 receives a UWB signal wirelessly transmitted from the RF transmission unit 130 of the main unit 100. In step S130, the RF receiver unit 230 identifies a subband of the received UWB signal and generates a bit group according to the identification result. When RF receiver unit 230 converts the generated bit group to digital data, in step S140, the display controller 220 stores the converted digital data in the memory 240 and displays it on the display module 250. If the converted digital data includes video data and audio data, the display controller 220 outputs the audio data using the audio output unit 260.

In a state where image data is displayed on the display module 250, the user can store the displayed image data in the mobile terminal A compatible to the display unit 200. When the user couples the display unit 200 into the main unit of the mobile terminal A, the mobile terminal A senses the coupling of the display unit 200 and stores the image data displayed on the display module 250. This process will be described below in detail with reference to FIG. 8. Since the main unit of the mobile terminal A is compatible to the display unit 200, the main unit of the mobile terminal A has the same structure as that of the main unit 100 according to the present invention, and in this case, the display unit of the mobile terminal A is separated in advance from the main unit of the mobile terminal A by the user in order to couple the display unit 200 into the main unit of the mobile terminal A.

Figure 8:
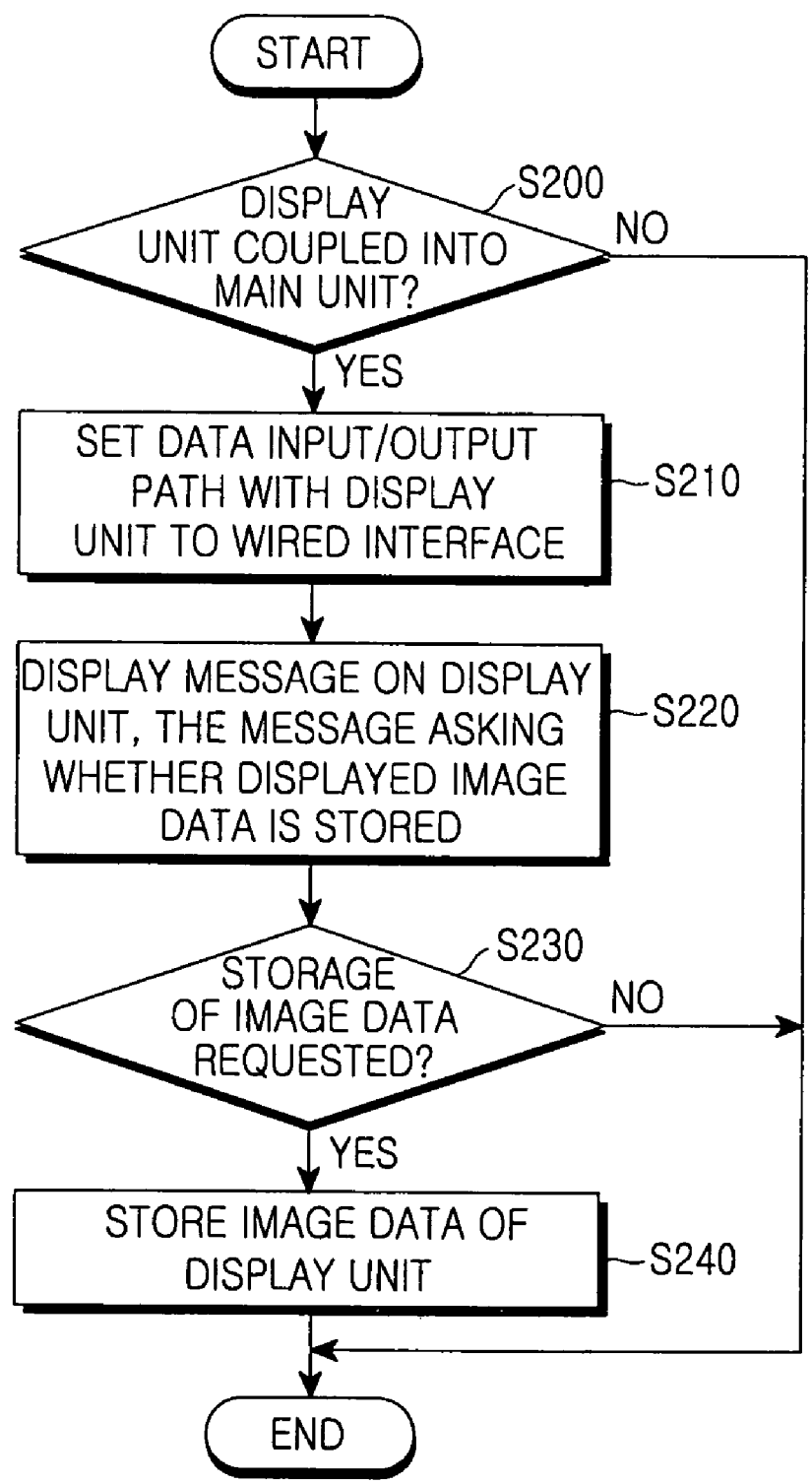
FIG. 8 is a flowchart illustrating a method of storing image data displayed on the display unit of the mobile terminal in another mobile terminal, according to the present invention.

FIG. 8 is a flowchart illustrating a method of storing image data displayed on the display unit 200 of the mobile terminal in still another mobile terminal, according to the present invention.

Referring to FIG. 8, in step S200, the main unit of the mobile terminal A determines using the first separation sensor 110 whether the display unit 200 is coupled into the main unit of the mobile terminal A. Upon determination that the display unit 200 is coupled into the main unit of the mobile terminal A as the determination result, in step S210, the mobile terminal A sets a data input/output path with the display unit 200 to the wired interface. In this case, the display unit 200 also sets a data input/output path with the main unit of the mobile terminal A to the wired interface by sensing the coupling to the main unit of the mobile terminal A using the second separation sensor 210.

In step S220, the main unit controller 120 of the mobile terminal A displays a message on the display module 250, inquiring whether the image data displayed on the display module 250 of the display unit 200 is stored. In step S230, the main unit controller 120 of the mobile terminal A displays the message on the display module 250 of the display unit 200. Thereafter, it determines whether a key is pressed for requesting to store the image data. As soon as the display unit 200 is coupled into the main unit of the mobile terminal A, the message is displayed on the display module 250 by overlapping the message onto an existing screen. The user can then confirm the image data displayed on the display module 250 of the display unit 200 and press the key for requesting to store the displayed image data.

If the key is pressed for requesting to store the displayed image data, in step S240, the main unit controller 120 of the mobile terminal A stores the image data stored in the memory 240 of the display unit 200, i.e., the image data displayed on the display module 250, in the built-in memory via the wired interface.

According to the present invention, since a display unit of a mobile terminal for storing and displaying photographed image data is separated, the image data can easily move by coupling the display unit 200 into another mobile terminal.

In addition, by separating the display unit 200 of the mobile terminal from a main unit, the main unit can be used as a remote control when a DMB program is displayed on the separated display unit.

Furthermore, it is difficult for a user to safely stand a conventional mobile terminal, which has a DMB receiving function and has a display unit formed in one body with a main unit, due to the weight and size thereof. However, the display unit including built-in supporters according to the present invention can stand more safely than the conventional mobile terminal by being separated from the main unit.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile terminal having a display unit separable from a first main unit,
   the first main unit comprising:
   a first separation sensor for sensing whether the display unit is separated from the first main unit;
   a Radio Frequency (RF) transmission unit for wirelessly transmitting data to the display unit when the display unit is separated from the first main unit; and
   a main unit controller for setting a path of the data to be output to the display unit to the RF transmission unit if the separation of the display unit is sensed by the first separation sensor, and
   the display unit comprising:
   a second separation sensor for sensing separation of the display unit from the first main unit;
   an RF receiver unit for receiving data wirelessly transmitted from the RF transmission unit when the display unit is separated from the first main unit;
   a display controller for setting a path of the data input to the display unit to the RF receiver unit if the separation from the first main unit is sensed by the second separation sensor;
   a memory for storing the data received by the RF receiver unit; and
   a display module for displaying the data stored in the memory,
   wherein, if the display unit is coupled to a main unit of a compatible mobile terminal that is compatible with the display unit, the data stored in the memory is stored in the main unit of the compatible mobile terminal.

2. The mobile terminal of claim 1, wherein the display unit further comprises an audio output unit for outputting audio data received by the RF receiver unit,
   wherein the data transmitted wirelessly from the first main unit to the display unit comprises the audio data.

3. The mobile terminal claim 2, wherein, when the display unit is not separated from the first main unit, the main unit controller inputs/outputs data between the first main unit and the display unit using a wired interface.

4. The mobile terminal of claim 1, wherein the display unit further comprises a power supply for supplying self-power.

5. The mobile terminal of claim 1, wherein the display unit further comprises supporters for providing repulsive power to support the display unit inclined by contacting the ground.

6. The mobile terminal of claim 5, wherein the supporters are built in both sides of the display unit and contact the ground by being rotated by a user in the direction away from the display unit.

7. The mobile terminal of claim 1, wherein a communication method between the RF transmission unit and the RF receiver unit is an Ultra WideBand (UWB) communication method.

8. A method of controlling a display unit of a mobile terminal having the display unit separable from a first main unit, the method comprising:
   sensing whether the display unit is separated from the first main unit;
   wirelessly transmitting data from the first main unit to the display unit if the display unit is separated from the first main unit;
   wirelessly receiving, by the display unit separated from the first main unit, the data transmitted from the first main unit and storing the received data in a memory of the display unit;
   displaying the data stored in the memory;
   determining, by the display unit, whether the display unit is coupled to a main unit of a compatible mobile terminal that is compatible with the display unit;
   if the display unit is coupled to the main unit of the compatible mobile terminal, determining whether a storage request of the data stored in the memory is input from the main unit of the compatible mobile terminal; and
   if the storage request of the data is input, storing the data stored in the memory into the main unit of the compatible mobile terminal.

9. The method of claim 8, wherein the data wirelessly transmitted from the first main unit to the display unit comprises audio data, and the display unit receives the audio data transmitted from the first main unit and outputs the received audio data using an audio output unit therein.

10. The method of claim 9, further comprising inputting/outputting, by the first main unit, data from/to the display unit using a wired interface if the display unit is not separated from the first main unit.

11. The method of claim 8, wherein the display unit further comprises a power supply for supplying self-power.

12. The method of claim 8, wherein the display unit further comprises supporters for providing repulsive power to support the display unit inclined by contacting the ground.

13. The method of claim 12, wherein the supporters are built in both sides of the display unit and contact the ground by being rotated by a user in the direction away from the display unit.

14. The method of claim 8, further comprising inputting/outputting, by the first main unit, data from/to the display unit using a wired interface if the display unit is not separated from the first main unit.

15. The method of claim 8, wherein a communication method between the RF transmission unit and the RF receiver unit is an Ultra WideBand (UWB) communication method.

* * * * *